United States Patent Office 2,738,339
Patented Mar. 13, 1956

2,738,339

PHENOLIC CONDENSATION PRODUCTS MADE WITH DIVALENT TIN COMPOUND TO REDUCE COLORATION

Robert S. Taylor, Oak Lawn, and Lynwood N. Whitehill, Homewood, Ill., assignors to The Sherwin-Williams Company, Cleveland, Ohio, a corporation of Ohio No Drawing. Application March 20, 1952, Serial No. 277,718

11 Claims. (Cl. 260—45.75)

This invention relates to a method of color improvement in the manufacture of resinous phenolic bodies formed by condensation reactions in alkaline media.

More particularly, this invention relates to phenolic resins formed by condensation of phenols as a class with one or more of the reactants selected from the group consisting of aldehydes, epihalohydrins and alkyl and alkaryl dihalides under alkaline reaction conditions by inclusion in the reaction mass during the condensation of small amounts of a tin compound capable of forming a divalent tin ion under conditions of the reaction to enhance the achromic character of the product.

In its more specific aspects, this invention relates to ether resins formed by the condensation of a dihydric phenol and epichlorohydrin in an aqueous alkaline media in the presence of small amounts of a compound which forms divalent tin ions under the conditions of the reaction.

Upon condensing phenols with polyfunction reactants to form resinous bodies, it is a common experience to find the resinous products formed to be off towards the red in color. Despite the use of inert gases as blankets to avoid contact with the air, oxidation is believed to occur. It is further believed that oxidation leads to formation of color bodies which are extremely objectionable in the final resin, particularly when the phenolic condensate is to be employed in the protective and decorative coatings art. In a series of experimental trials, a number of additives were individually incorporated into phenolic condensation reaction masses and included manganous salts, mercurous salts, cuprous salts, cobaltous salts, chromium salts, ferrous salts and zinc metal. All of these materials were objectionable for one reason or another. Most often the color introduced by the additive is itself objectionable. Zinc metal showed promise but hydrogen liberation introduced a safety hazard and complex zinc compounds formed in the reaction mass tend to form stable emulsions which seriously interfere with removal of impurities from the formed resin. Mercurous and ferrous salts were not effective. However, it has been found that upon addition of stannous chloride, for example, the resinous products obtained are of achromic color character, e. g., lighter or paler, and no complexities are encountered in the removal of the products of reaction upon subsequent purification of the formed resin. While stannous chloride is the preferred additive, as it is readily available in a pure form, other stannous materials including sodium stannite ($Na_2SnO_2$) stannous oxalate, stannous hydroxide ($Sn(OH)_2$), etc., may be added to provide divalent tin ions essentially present in the aqueous alkaline reaction media to accomplish the ends of this invention. While certain divalent tin ion sources are insoluble in water, for instance, stannous oxalate, upon addition to the aqueous alkaline solution, alkali stannite is believed to form. As the stannous salts employed under the conditions of the reaction are water soluble they are readily removed by washing after resin formation and they do not enter into subsequent compositions to cause complications in the end usage of the resinous products.

Resins formed by condensation of phenols with other aliphatic polyfunctional materials in alkaline media are formed by similar techniques. The selected phenol is usually added to sufficient alkali to form a soluble or readily dispersible alkali metal salt. Among the phenols useful in forming resinous bodies for protective coating resins are the alkyl-substituted phenols including butyl phenol and amyl phenol, the aryl substituted phenols including p-phenyl phenol, and of particular interest to this invention the dihydric phenols, including di(phenyl phenol), di(4 hydroxy phenyl) methyl methane, di(4 hydroxy phenyl) methyl ethyl methane, di(4 hydroxy phenyl) propyl methane, di(4 hydroxy phenyl) dipropyl methane, di(4 hydroxy phenyl) phenyl methane, (p-p' dihydroxy diphenyl dimethyl methane) and particularly di(4 hydroxy phenyl) dimethyl methane.

Suitable reactants employed with the above phenols as the secondary polyfunctional material essential to resin formation include aliphatic aldehydes, e. g., formaldehyde, etc.; epihalohydrins, particularly epichlorohydrin, aliphatic dihalogens including $\beta$-$\beta'$ dichlorodiethyl ether, 2'-2' dichloro-diisopropyl ether, etc. (Reactants of this class are discussed in U. S. 2,060,715).

As the prior art in the above field of phenolic condensations in aqueous alkaline media is replete with examples and discussions of various methods and products of a resinous nature, it is believed repetitious to go into detail in respect to the resin-forming reaction. This reaction is well-known and has been a source of great contribution to the resin art.

Briefly, however, in the practice of the improvement in the process here disclosed, the selected phenolic constituent is dispersed in an aqueous alkaline solution and a water-soluble or water-dispersible alkali metal salt generally formed. At this point, the component which marks the improvement in the process may be added; namely, a compound capable of providing a divalent tin ion source under the conditions of the reaction.

Thereafter the secondary reactant, for example, epichlorohydrin, is added preferably in increments to assist reaction rate control with or without additional solvent and the reaction mass heated to the point of reflux. Presence of the divalent tin ion during the condensation prevents discoloration of the resin during formation. After the reaction is completed, the mass is neutralized with acid and the product washed to remove inorganic salts and other impurities which may be formed during the course of the reaction.

The following examples illustrate the preferred mode of accomplishing the result intended contrasted with similar examples wherein our improvement in the process is not incorporated. The improvement in the color or achromic character of the resin obtained is of considerable importance when the resin is used as an intermediate in varnish formation. These examples are not to be construed as limiting, but merely illustrative of the practice and effectiveness of the method.

Example 1

211 parts sodium hydroxide dissolved in 880 parts of water are combined with 254 parts of a butyl phenol-formaldehyde type resin (with a phenol to formaldehyde ratio of 1.25 to 1) and 912 parts of di(4 hydroxy phenyl) dimethyl methane plus 1040 parts methyl isobutyl ketone. The above ingredients were charged into a flask and heated to 190 degrees F. At this temperature, 453 parts of epichlorohydrin were cautiously added over a period of 1½ hours, after which refluxing at this temperature was maintained for an additional three hours. The mixture was cooled and then neutralized with phosphoric acid to a pH of approximately 6. The pH was then reduced to 3-4 using a small amount of oxalic acid. The resin solution was washed several times with water and separated. The remaining water was removed azeotropically, followed by removing solvent and finally steam blowing. The final product had the following characteristics:

M. P. _____ 207 degrees F.
Visc. at 60% NVM in methyl isobutyl ketone. _____ $Z_5$ to $Z_6$ (Gardner).

At this viscosity, the color is 11-12 (Hellige Color Comparator Scale).

*Example 2*

This is similar to Example 1, except that the aqueous alkali solution is added to the other ingredients. The various amounts are 2400 parts methyl isobutyl ketone, 1954 parts of the above-mentioned butyl phenol-formaldehyde resin, 1954 parts of di(4 hydroxy phenyl) dimethyl methane, 1390 parts of epichlorohydrin and 8 parts of stannous chloride. The alkali solution consisted of 605 parts of sodium hydroxide dissolved in 2000 parts of water. The final product had the following characteristics:

M. P. _____ 185-190 degrees F.
Visc. at 50% NVM in methyl isobutyl ketone. _____ E (Gardner).
Color _____ 3 (Hellige).

*Example 3*

1140 parts di(4 hydroxy phenyl) dimethyl methane, 900 parts of methyl isobutyl ketone and 463 parts of epichlorohydrin were charged into a flask and heated. At a temperature of 180 degrees F., 210 parts of sodium hydroxide dissolved in 1650 parts water were added cautiously over a period of 35 minutes. The mixture was refluxed at a temperature of 200 degrees F. for a period of three hours, after which it was cooled and then neutralized to a pH of 5-6 using phosphoric acid. The final resin was isolated in a similar manner as explained in Example 1. The final product had the following characteristics:

M. P. _____ 198-200 degrees F.
Visc. at 50% NVM in methyl isobutyl ketone. _____ V-W (Gardner).
Color _____ 11 (Hellige).

*Example 4*

This is a repeat of Example 3, except that in the beginning of the procedure 5 parts by weight of stannous chloride were added. The final product had the following characteristics:

M. P. _____ 105 degrees F.
Visc. at 50% NVM in methyl isobutyl ketone. _____ A (Gardner).
Color _____ 5 (Hellige).

*Example 5*

1960 parts of di(4 hydroxy phenyl) dimethyl methane combined with 500 parts of sodium hydroxide were dissolved in 3300 parts of water. The temperature was raised to 160 degrees F. Into this mixture was added 200 parts of methyl isobutyl ketone in 925 parts of epichlorohydrin over a period of 3 hours and 25 minutes. Refluxing was maintained at 195 degrees F. for an additional half hour, after which 1600 parts of methyl isobutyl ketone were added and the mixture allowed to cool. The mixture was acidified to a pH of 5 using phosphoric acid. The final product was isolated in a manner similar to Example 1. The final characteristics were:

M. P. _____ 189-200 degrees F.
Visc. at 50% NVM in methyl isobutyl ketone. _____ V-W (Gardner).
Color _____ 11 (Hellige).

*Example 6*

160 parts of di(4 hydroxy phenyl) dimethyl methane were added to a solution of 36 parts of sodium hydroxide in 267 parts of water plus 1 part of stannous chloride. This mixture was heated to 150 degrees F. and 16 parts of methyl isobutyl ketone in 82 parts of epichlorohydrin were added over a period of 2 hours and 15 minutes, after which refluxing was maintained at 190 degrees F. for 1 hour. 170 parts of methyl isobutyl ketone were then added to the mixture and it was allowed to cool. The resin solution was neutralized with phosphoric acid to a pH of 6. The final product was isolated in a manner similar to that described in Example 1. The final characteristics of the resin were:

Viscosity at 50% NVM in the following mixture:

50% toluene _____ ⎫
42% cellosolve acetate _____ ⎬ $Z_1$ (Gardner).
8% methyl isobutyl ketone _____ ⎭

Color (Hellige) _____ 4-5.

*Example 7*

Into a five liter flask equipped with agitator, reflux condenser, dropping funnel and thermometer were weighed 951 parts phenol containing 11% water and 21 parts stannous oxalate. The temperature was increased slowly to reflux while adding 759 parts of 37% aqueous formaldehyde solution. At reflux, a mixture containing 200 parts water and 11 parts caustic soda was started into the reaction mass and completed within 10 minutes. The mixture was allowed to reflux gently at 212 degrees F. for approximately 4½ hours.

The color of the resulting resin was within the range of 4 to 5 numbers lighter than an equivalent batch made not containing the divalent tin additive, stannous oxalate, during the cook. The cure value of the run wherein stannous oxalate was included was higher, indicating that the additive also exhibited a control over the polymerization rate.

*Example 8*

To a mixture of 730 parts di(4 hydroxy phenyl) dimethyl methane and 5 parts of stannous chloride was added a solution of 141 parts of sodium hydroxide in 1370 parts of water. To this mixture heated to 190 degrees were added dropwise with stirring 305 parts of epichlorohydrin dissolved in 200 parts of methyl isobutyl ketone. After addition was complete, the mixture was diluted further with 400 parts of methyl isobutyl ketone and the resultant mixture heated under reflux for one hour.

Neutralization of the mixture with phosphoric acid to a pH of 6 was effected. Phase separation took place and the water layer was removed. After washing to remove salt the solvent was removed by distillation and the resin dumped. At 50% NVM in methyl isobutyl ketone it had a color of 6 on the Hellige scale.

*Example 9*

A resin made identically to Example 8 except that no stannous chloride was used and had a color of 9 on the same scale.

*Example 10*

That tin salt can also be added as the stannite ion is shown as follows:

The above reaction as in Example 8 was carried out using sodium stannite prepared by dissolving 5 parts of stannous chloride in 50 parts of a 10% sodium hydroxide solution. The product had a color of 6.

While it is preferred to use polyfunctional phenols which are para substituted, other polyfunctional phenols which are otherwise substituted may be used in whole or in part in lieu of the preferred class.

Attention should be drawn to the fact that use of stannous chloride in the polymerization reaction bears no relation to the use of stannic chloride as a polymerization catalyst as it is sometimes employed under anhydrous reaction conditions.

The quantities of divalent tin present in the reaction mass are preferably from about 0.3 to about 0.6% based on the weight of the phenolic body but more or less may be employed as will be apparent from several trial runs. The quantity of divalent tin ion essential to enhance the achromic character is of little additional value above 1% based on the same component of the reaction. While below about 0.1% optimum appreciation in color value is not obtained, it has been observed that when once SnCl₂ is employed in a reaction vessel, subsequent batches show less difference when the divalent tin salt is not employed. This will be observed in Examples 8, 9 and 10 where the flask was not cleaned between batches by vigorous chemical means but merely by organic solvents.

Now having described and illustrated a novel method for improving the color characteristics of phenolic-containing resins of the alkaline condensation class and the best method of accomplishing the ends of the invention, we claim:

1. In the manufacture of a polymeric body useful in the coating art by condensation of a polyhydric phenol with epihalohydrin reactive with said phenol under aqueous alkaline conditions, the improvement in method which comprises including in said reaction mass during said condensation of a quantity of a divalent tin compound soluble in aqueous alkaline solutions sufficient to enhance the achromic character of the end product of said condensation.

2. In the manufacture of a polymeric body useful in the coating art by condensation of a polyhydric phenol with epichlorohydrin reactive with said phenol under aqueous alkaline conditions, the improvement in method which comprises including in said reaction mass during said condensation of a quantity of a divalent tin compound soluble in aqueous alkaline solutions sufficient to enhance the achromic character of the end product of said condensation.

3. In the condensation of a dihydric phenol with epichlorohydrin under aqueous alkaline conditions, the improvement in method which comprises including in said reaction mass during said condensation a quantity of a divalent tin compound effective to enhance the achromic character of the end product of said condensation.

4. In the aqueous alkaline condensation of a di(4 hydroxy phenyl) alkane with epichlorohydrin, the improvement in method which comprises including in said reaction mass during said condensation a quantity of a divalent tin compound effective to enhance the achromic character of said condensation product.

5. In the aqueous alkaline condensation of a polyhydric phenol with a staturated aliphatic dihalide reactive therewith to form a polymeric reaction product, the improvement in method which comprises including in the reaction mass during condensation in excess of 0.1% but less than about 10% based on the weight of the phenol of a divalent tin compound soluble in aqueous alkaline solutions.

6. In the aqueous alkaline condensation of a polyhydric phenol with an epihalohydrin reactive therewith to form a polymeric reaction product. the improvement in method which comprises including in the reaction mass during condensation from about 0.1% but less than about 10% based on the weight of the said phenol of stannous chloride.

7. In the aqueous alkaline condensation of a di(4 hydroxy phenyl) alkane with epichlorohydrin the improvement in method which comprises including in said reaction mass from about 0.3% to about 0.6% based on the weight of said phenolic constituent of stannous chloride.

8. In the manufacture of polymeric glycidyl ethers from polyhydric phenols and epichlorohydrin under aqueous alkaline conditions the improvement in method which comprises including in the reaction mass during condensation in excess of 0.1% but less than about 10% by weight of the phenolic constituent of a divalent tin compound soluble in aqueous alkaline solutions.

9. In the manufacture of phenol-aldehyde polymers under aqueous alkaline conditions the improvement in method which comprises including in the reaction mass during condensation in excess of 0.1% but less than about 10% by weight of the phenolic constituent of a divalent tin compound soluble in aqueous alkaline solutions.

10. In the manufacture of a polymeric body useful in the coating art by copolymerizing a phenol having more than one reactive center with a saturated difunctional compound selected from the group consisting of aldehydes, epihalohydrins, alkyl and aryl dihalides and admixtures thereof under aqueous alkaline conditions to form a resinous body, the improvement in method which comprises including in said reaction mass during said condensation a quantity of a divalent tin compound soluble in aqueous alkaline solutions sufficient to enhance the achromic character of the end product of said copolymerization reaction.

11. A process for manufacturing a polymeric body which comprises solubilizing at least a part of a phenol having a plurality of reactive centers in an aqueous alkaline medium and copolymerizing said phenol with a difunctional saturated compound selected from the group consisting of aldehydes, epihalohydrins, alkyl and aryl dihalides and admixtures thereof at a temperature below 212° F. and including as a part of said reaction mass a quantity of a divalent tin compound soluble in the aqueous phase under the conditions of the reaction sufficient to enhance the achromic character of the polymeric body so formed.

References Cited in the file of this patent

UNITED STATES PATENTS

| | | |
|---|---|---|
| 2,528,934 | Wiles | Nov. 7, 1950 |
| 2,642,412 | Newey et al. | June 16, 1953 |

FOREIGN PATENTS

| | | |
|---|---|---|
| 556,126 | Great Britain | Sept. 21, 1943 |